United States Patent
Saito

(10) Patent No.: US 8,687,232 B2
(45) Date of Patent: Apr. 1, 2014

(54) FUNCTION EXECUTION DEVICE

(75) Inventor: Ken Saito, Tokoname (JP)

(73) Assignee: Brother Kogyo Kabushiki Kaisha, Nagoya-Shi, Aichi-Ken (JP)

(*) Notice: Subject to any disclaimer, the term of this patent is extended or adjusted under 35 U.S.C. 154(b) by 335 days.

(21) Appl. No.: 13/053,685

(22) Filed: Mar. 22, 2011

(65) Prior Publication Data

US 2011/0310408 A1  Dec. 22, 2011

(30) Foreign Application Priority Data

Jun. 16, 2010  (JP) .................................. 2010-136893

(51) Int. Cl.
*G06F 15/00* (2006.01)

(52) U.S. Cl.
USPC ............ 358/1.9; 358/1.15; 709/226; 709/228

(58) Field of Classification Search
USPC ........... 358/1.9, 1.15; 709/221, 226; 719/327; 345/619; 710/8, 14, 700
See application file for complete search history.

(56) References Cited

U.S. PATENT DOCUMENTS

| | | | |
|---|---|---|---|
| 7,075,670 B1 * | 7/2006 | Koga | 358/1.15 |
| 2003/0053129 A1 * | 3/2003 | Morooka et al. | 358/1.15 |
| 2006/0242272 A1 | 10/2006 | Furukawa | |

FOREIGN PATENT DOCUMENTS

| | | |
|---|---|---|
| JP | 10-136142 | 5/1998 |
| JP | 2006-99362 | 4/2006 |
| JP | 2009-64290 | 3/2009 |

* cited by examiner

*Primary Examiner* — King Poon
*Assistant Examiner* — Jamares Q Washington
(74) *Attorney, Agent, or Firm* — Scully, Scott, Murphy & Presser, P.C.

(57) ABSTRACT

A function execution device connected to at least one other device includes: a memory storing a plurality of setting values corresponding to a plurality of setting items; an execution portion executing a function by using the plurality of setting values; a screen data supply portion supplying, to a display device, device screen data for showing a device screen, on which a user selects a target device from the at least one other device, and item screen data for showing an item screen, on which the user selects at least one setting item from the plurality of setting items; an acquisition portion that acquires device information about the target device; and a transmission portion transmitting, to the target device, at least one setting value corresponding to the at least one setting item selected by the user on the item screen, among the plurality of setting values stored in the memory.

11 Claims, 12 Drawing Sheets

CLICK THE COPY ITEM GROUPING 115a ON THE COPY MAIN SCREEN 110d OF FIG. 3 AND THEN CLICK THE GROUP SELECTION 115b ON THE COPY MAIN SCREEN 110a OF FIG. 2

COPY MAIN SCREEN 110e

COPY DESTINATION DESIGNATION
ITEMS TO BE COPIED
☐D1 ☐D2 ☑D3 ☐D4 ☑D5
☑D6 ☐D7 ☐D8 ☐D9 ☐D10 (ADDRESS BOOK)

FIG. 5

CLICK THE ADDRESS SELECTION 116b ON
THE COPY MAIN SCREEN 110b OF FIG. 2

ADDRESS SELECTION SCREEN 140

ALREADY SELECTED ADDRESS NUMBER, 40
"AAA" MAXIMUM ADDRESS NUMBER, 20
COPYABLE ADDRESS NUMBER, 15
DESIGNATION AND RELEASE OF A PROTECTION ADDRESS ←144

| NO. | NAME | ADDRESS |
|-----|------|---------|
| ☑ 1 | N1 | A1 |
| ☑ 2 | N2 | A2 |
| ... | | |

}142

PROTECTION ADDRESS SCREEN 150

"AAA" MAXIMUM ADDRESS NUMBER, 20
COPYABLE ADDRESS NUMBER, 15
☑ IS PROTECTED

| NO. | NAME | ADDRESS |
|-----|------|---------|
| ☑ 1 | N3 | A3 |
| ☐ 2 | N4 | A4 |
| ... | | |

CLICK THE PROFILE PREPARATION 117
ON THE COPY MAIN SCREEN 110d OF FIG. 3

PROFILE SCREEN 160

COPY DESIGNATIONS "AAA", "BBB"
ITEMS TO BE COPIED
☐D1 ☐D2 ☑D3 ☐D4 ☑D5 (NON-COPYABLE TO "AAA")
☑D6 ☐D7 ☐D8 ☐D9      (NON-COPYABLE TO "BBB")
☐D10 (ADDRESS BOOK)

PROFILE NAME _____
OPTION
☐ PERIODICALLY COPYING ~162
   TIME _____ FREQUENCY _____
☐ COPYING IN CASE OF CHANGE OF SETTING VALUES ~164

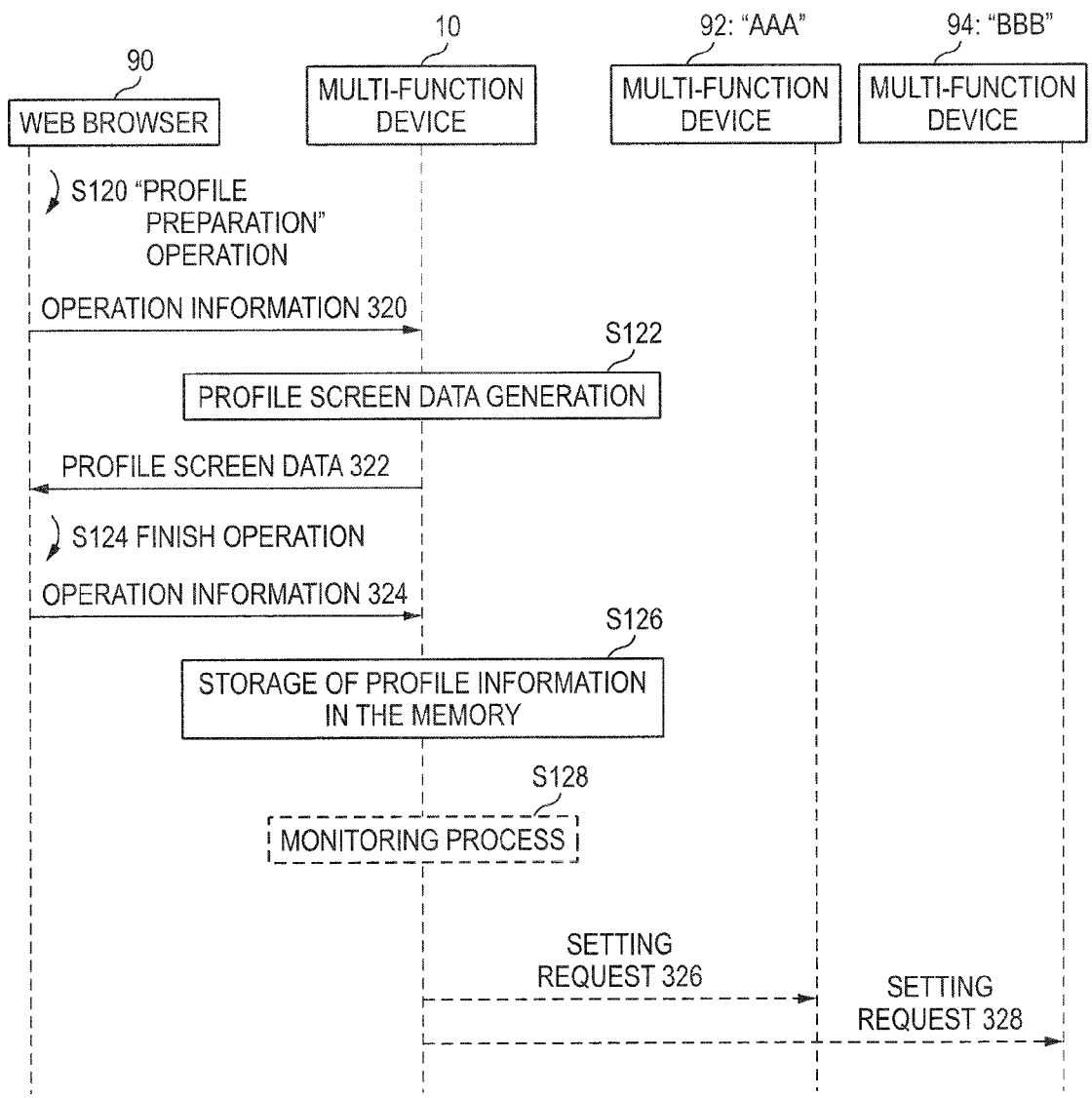

FUNCTION EXECUTION DEVICE

CROSS-REFERENCE TO RELATED APPLICATIONS

This application claims priority from Japanese Patent Application No. 2010-136893 filed on Jun. 16, 2010, the entire subject matter of which is incorporated herein by reference.

TECHNICAL FIELD

The present invention relates to a function execution device, which is connected to at least one of other devices.

BACKGROUND

There has been proposed a related-art printer, which is connected to a host computer. The printer includes a web server function. The host computer accesses the printer through the web server by using a web browser equipped in the host computer. In this case, the web server of the printer transmits various setting values of the printer to the host computer. The web browser of the host computer can display the various setting values of the printer. As a result, a user of the host computer can see the various setting values of the printer, and can change the various setting values.

SUMMARY

Illustrative aspects of exemplary embodiments of the present invention provide technology, that may enable a user to easily set setting values of a function execution device (the printer in the above example) to other devices. However, exemplary embodiments are not required to provide this potential benefit or any other benefit and are only limited by the specific features recited in the claims.

BRIEF DESCRIPTION OF THE DRAWINGS

FIG. 5 shows one example of an address selection screen, and a protection address screen;

FIG. 6 shows one example of a profile screen;

FIG. 12 is a sequence view of processes for a profile.

DETAILED DESCRIPTION

General Overview

Figure 1:
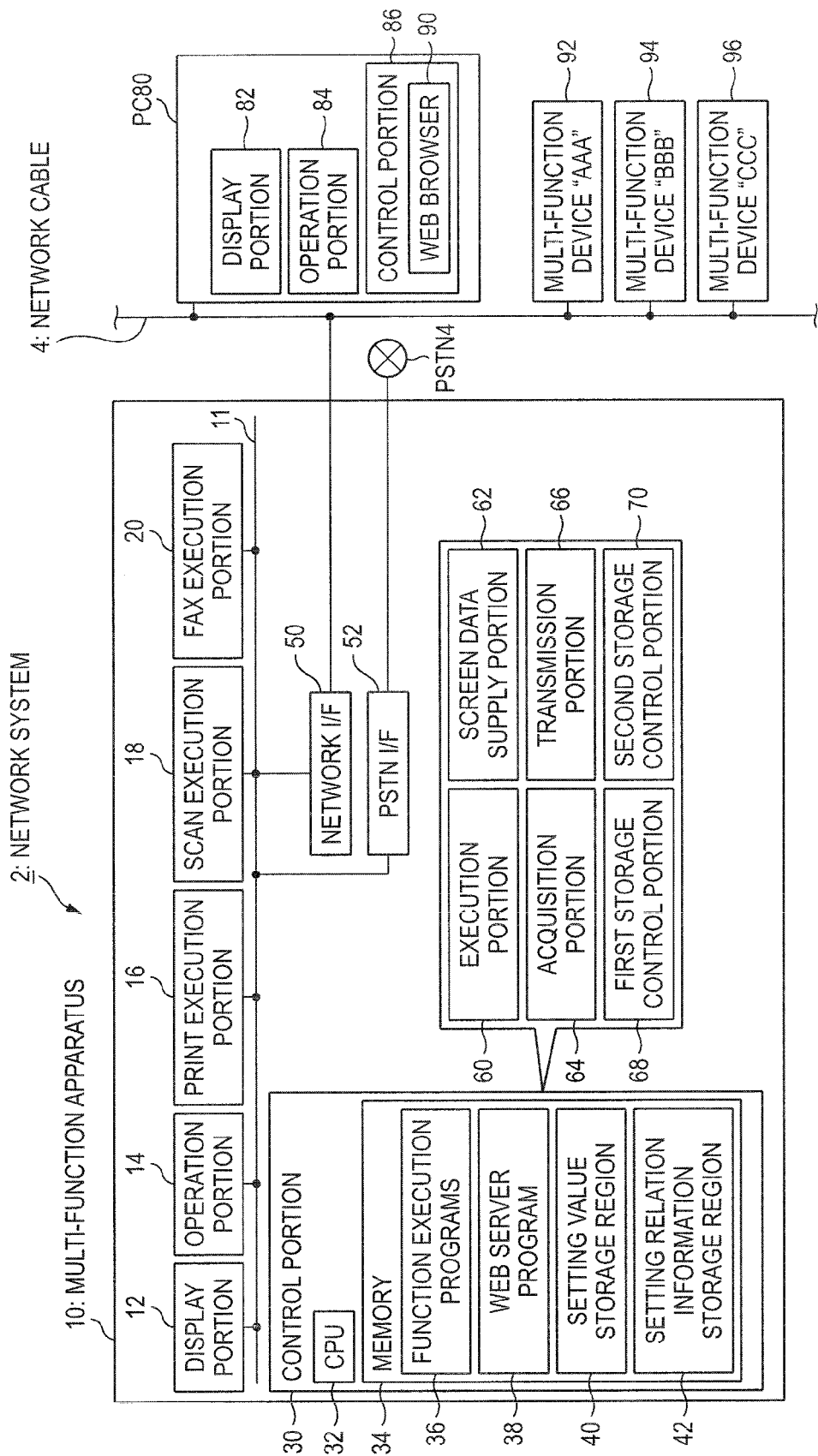
FIG. 1 shows a configuration of a network system.

The related-art printer does not disclose setting (i.e., copying) the setting values of the printer to other devices. Therefore, illustrative aspects of exemplary embodiments of the present invention provide technology, which enables a user to easily set setting values of a function execution device (the printer in the above example) to other devices.

According to one aspect of the invention, there is provided a function execution device connected to at least one other device, the function execution device comprising: a memory storing a plurality of setting values corresponding to a plurality of setting items; an execution portion capable of executing a function by using the plurality of setting values stored in the memory; a screen data supply portion supplying, to a display device, device screen data for showing a device screen, on which a user selects a target device from the at least one other device, and item screen data for showing an item screen, on which the user selects at least one setting item from the plurality of setting items; an acquisition portion that acquires device information about the target device; and a transmission portion transmitting, to the target device, at least one setting value corresponding to the at least one setting item selected by the user on the item screen, among the plurality of setting values stored in the memory, wherein in a first case where only a first target device is selected on the devices screen, the screen data supply portion generates first item screen data showing a first item screen, on which a first type of setting items, which can be set for the first target device, among the plurality of setting items distinguished from a second type of setting items, which cannot be set for the first target device, among the plurality of setting items.

In the above configuration, in order to enable the function execution device to supply device screen data and item screen data to a display device, a user can select a target device on a device screen, and select at least one setting item on an item screen. Once designating a target device and at least one setting item is performed by the user, the function execution device transmits at least one setting value corresponding to the at least one setting item to the target device. As a result, the at least one setting value is set (i.e., copied) to the target device. In a first case where a first target device alone is selected on the device screen, the function execution device uses first device information acquired from the first target device, and generates first item screen data showing a first item screen, on which a first type of setting items, which can be set to the first target device, is distinguished from a second type of setting items, which cannot be set to the first target device. Accordingly, the user can easily see the first type of setting items, which can be set to the first target device. As a result, the user can easily select setting items, which are to be set (i.e., copied) to the first target device. According to the above configuration, the user can easily set setting values of the function execution device to the first target device.

A control method and a computer program for realizing the function of the function execution device, and a computer readable storage medium for storing the computer program are also novel and useful.

Exemplary Embodiments

Exemplary embodiments of the present invention will now be described with reference to the drawings.

(Configuration of the System)

An embodiment of the present invention will now be described below with reference to drawings. As shown in FIG. 1, a network system 2 includes a PC 80 and a plurality of multi-function devices 10 and 92 to 96, which are peripherals of the PC 80. The PC 80 and each of the multi-function devices 10 and 92 to 96 can communicate with each other through a network cable 4.

(Configuration of the Multi-Function Device 10)

The multi-function device 10 is capable of executing multiple functions including a print function, a scan function, and a fax function. The multi-function device 10 includes a display portion 12, an operation portion 14, a print execution portion 16, a scan execution portion 18, a fax execution portion 20, a control portion 30, a network interface 50, and a PSTN interface 52. Each of the portions 10 to 20, 30, 50, and 52 is connected to a bus line 11. The display portion 12 is a display for displaying various information. The operation portion 14 is configured by a plurality of keys. By operating the operation portion 14, a user can assign various commands to the multi-function device 10. The print execution portion 16 includes print equipment in inkjet, laser, or other manners. The scan execution portion 18 includes an image sensor such as CCD and CID. The fax execution portion 20 includes hardware (e.g., a modem) for executing fax communication through the PSTN (Public Switched Telephone Network) 4. The network interface 50 is connected to the network cable 4. The PSTN interface 52 is connected to the PSTN 4.

The control portion 30 includes a CPU 32 and a memory 34. The CPU 32 executes various processes in accordance with programs 36 and 38 stored in the memory 34. The CPU executes processes in accordance with the function execution program 36, so that a function of an execution portion 60 is realized. The CPU 32 executes processes in accordance with the web server program 38, so that a function of each of the portions 62 to 70 is realized. The memory 34 includes a setting value storage region 40, and a setting relation information storage region 42. The setting value storage region 40 stores a plurality of setting values (i.e., a plurality of setting values, which are currently being set in the multi-function device 10) corresponding to a plurality of setting items of the multi-function device 10. Examples of the plurality of setting items include a print paper size of a default, print resolution of a default, a copy paper size of a default, scan resolution of a default, storage location information showing storage location of scan data, an address book, and others. By operating the operation portion 14, the user can change each of the values in the setting value storage region 40. The setting relation information storage region 42 stores group information (refer to S72 of FIG. 10), which will be described later, profile information (refer to S126 of FIG. 12), and others.

(Configuration of the Other Multi-Function Devices 92 to 96)

The other multi-function devices 92 to 96 have the same configuration as the multi-function device 10. However, types of setting items, which can be set to the multi-function devices 10 and 92 to 96, may be different. For example, if a model (type) of the multi-function device 10 is different from a model of the multi-function device 92, there is a possibility that a certain setting item (e.g., print resolution of a default) can be set to the multi-function device 10, but cannot be set to the multi-function device 92. In this case, for example, an address book (a kind of setting items) can be set to either the multi-function device 10 or the multi-function device 92. However, the number of addresses, which can be stored in the address book of the multi-function device 10, may be different from the number of addresses, which can be stored in the address book of the multi-function device 92. In this embodiment, models of the multi-function devices 10, and 92 to 96 are different. The multi-function devices 92, 94, and 96 have their node names, "AAA," "BBB," and "CCC," respectively.

(Configuration of the PC 80)

The PC 80 includes a display portion 82, an operation portion 84, and a control portion 86. The display portion 82 is a display for displaying various information. The operation portion 84 is configured by a key board and a mouse. By operating the operation portion 84, a user can assign various commands to the PC 80. The control portion 86 includes CPU, ROM, RAM, and others, not illustrated. ROM of the control portion 86 stores a web browser program. CPU of the control portion 86 executes processes in accordance with the web browser program, so that the function of the web browser 90 is realized.

(Function Execution Processes Performed by the Multi-Function Device 10)

Next, function execution processes performed by the multi-function device 10 will be described. The execution portion 60 can execute various functions, by using a plurality of setting values stored in the setting value storage region 40 of the memory 34. For example, when executing the print function, the execution portion 60 commands the print execution portion 16 to execute printing with the print paper size of the default and the print resolution of the default stored in the setting value storage region 40. For example, when executing the scan function, the execution portion 60 commands the scan execution portion 18 to execute scanning with the scan resolution of the default stored in the setting value storage region 40. For example, when executing the fax function, the execution portion 60 commands the scan execution portion 18 to execute scanning with the scan resolution of the default stored in the setting value storage region 40. Further, the execution portion 60 commands the fax execution portion 20 to transmit scan data generated by the scan execution portion 18. In this case, for example, the execution portion 60 commands the fax execution portion 20 to transmit the scan data to a fax number selected by the user from the address book stored in the setting value storage region 40 as a transmission destination.

In addition to the print function, the scan function, and the fax function, the execution portion 60 may additionally execute other functions (e.g., electronic mail function, and call function), by using setting values (e.g., the address book) stored in the setting value storage region 40.

(Web Server Processes Executed by the Multi-Function Device 10)

Next, web server processes executed by the multi-function device 10 will be described. The web browser 90 of the PC 80 accesses the web server of the multi-function device 10, in accordance with URL (Uniform Resource Locator) of the web server of the multi-function device 10, which is entered by a user of the PC 80 by operating the operation portion 84. Accordingly, the multi-function device 10 executes web server processes. Prior to describing the web server processes in detail, each screen displayed on the display portion 82 of the PC 80, according to the execution of the web server processes, will be described.

(Top Screen)

Figure 2:
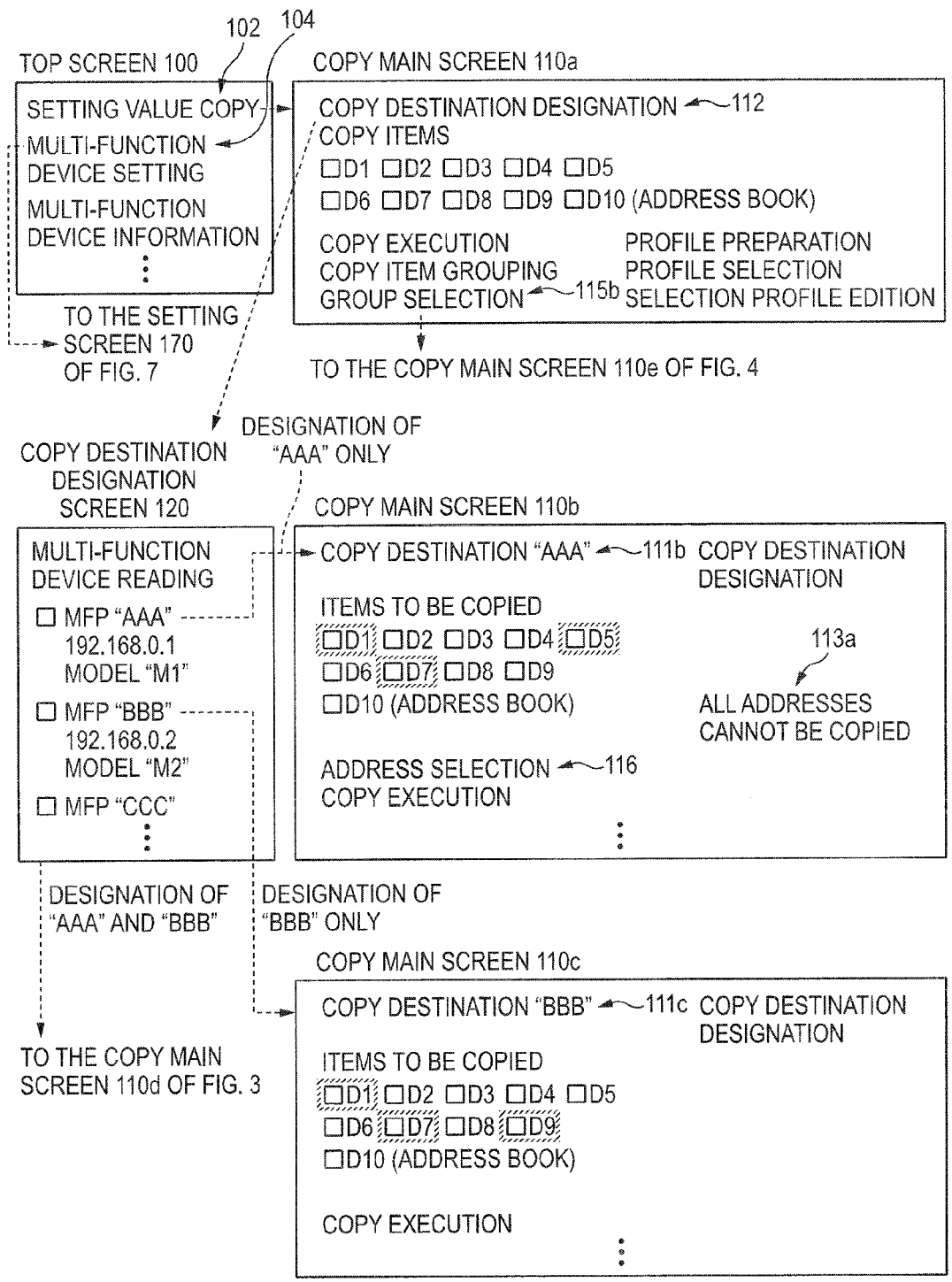
FIG. 2 shows one example of a top screen, a copy main screen, and a copy destination designation screen.

Once the web browser 90 of the PC 80 is accesses the web server of the multi-function device 10, as shown in FIG. 2, a top screen 100 is displayed. The top screen 100 includes a plurality of selection items 102 and 104. By operating the operation portion 84 of the PC 80, the user can select (i.e., click) one of the selection items 102 and 104 on the top screen 100. For example, if the user selects a selection item (reference numeral omitted) showing "multi-function device information," a screen showing various information (e.g., an IP address of the multi-function device 10) about the multi-function device 10 is displayed.

(Copy Main Screen (FIG. 2))

If the user selects the selection item 102 showing "setting value copy" on the top screen 100, a copy main screen 110a is displayed. The copy main screen 110a includes a selection item 112 showing "copy destination designation." The copy main screen 110a additionally includes a plurality of setting items D1 to D10. Meanwhile, on the copy main screen 110a, setting items are displayed by the symbols, D1, D2, and others. However, in actuality, each of the setting items is displayed by character strings implying the content of each of the setting items (e.g., "print resolution of a default"). Meanwhile, the setting item D10 corresponds to the address book. A check box is associated with each of the setting items D1 to D10. In other words, a check box is disposed near each of the setting items D1 to D10. Meanwhile, on the copy main screen 110a, check boxes corresponding to the setting items D1 to D10, respectively, are in a non-checked state. By operating the operation portion 84 of the PC 80, the user can change the state of at least one of the check boxes from the non-checked state to a checked state. By changing the state of the check boxes into the checked state, the user can select setting items (hereinafter, referred to as "target setting items") corresponding to setting values, which are to be copied to other multi-function devices. The copy main screen 110a additionally includes a plurality of other selection items ("copy execution," "copy item grouping" and others). These selection items will be described later.

(Copy Destination Designation Screen (FIG. 2))

If the user selects the selection item 112 showing "copy destination designation" on the copy main screen 110a, a copy destination designation screen 120 of FIG. 2 is displayed. The copy destination designation screen 120 includes information (node names, IP addresses, and model names) of the plurality of the other multi-function devices 92, 94, and 96 connected to the network cable 4, and a plurality of check boxes. By operating the operation portion 84 of the PC 80, the user can change the state of the check boxes corresponding to multi-function devices (hereinafter, referred to as "target multi-function devices"), to which setting values of the multi-function device 10 are to be copied, into the checked state. Accordingly, target multi-function devices are selected by the user. Meanwhile, the user may select only one target multi-function device, or a plurality of target multi-function devices.

(If the Multi-Function Device 92 (AAA) Alone is Selected)

If the multi-function device 92 alone having the node name "AAA" is selected on the copy destination designation screen 120, a copy main screen 110b of FIG. 2 is displayed. The copy main screen 110b is almost the same as the copy main screen 110a. The differences from the copy main screen 110a will be described. The copy main screen 110b includes information 111b showing that the multi-function device 92 is a target multi-function device. The copy main screen 110b also includes information 113a showing that all address information included in the address book of the multi-function device 10 cannot be set (i.e., copied) to the multi-function device 92.

Among a plurality of setting items D1 to D10 included in the copy main screen 110b, the setting items D2, D3 and others, and the setting items D1, D5, and D7 are displayed in different states. Specifically, the setting items D1, D5, and D7 are displayed in a so-called grayed-out state (i.e., in the state that cannot be selected by the user). The setting items D2, D3, and others are displayed in a normal state (i.e., in the state that can be selected by the user), and not the grayed-out state. In other words, the setting items D1, D5, and D7, and the setting items D2, D3, and others are displayed in different colors. While the setting items D2, D3, and others can be set to the multi-function device 92, the setting items D1, D5, and D7 cannot be set to the multi-function device 92, which will be described in detail later. The user can change the state of the check boxes corresponding to the setting items D2, D3, and others into the checked state, but cannot change the state of the check boxes corresponding to the setting items D1, D5, and D7 into the checked state. According to this configuration, it is possible to restrict the user from designating the setting items D1, D5, and D7, which cannot be set to the target multi-function device 92. Meanwhile, in another embodiment, the setting items D1, D5, and D7, which cannot be set to the multi-function device 92, as well as the setting items D2, D3, and others, which can be set to the multi-function device 92, may be displayed in the normal state that can be selected by the user (however, in the state that is distinguished from the setting items D2, D3, and others, which can be set to the multi-function device 92).

(If the Multi-Function Device (BBB) Alone is Selected)

If the multi-function device 94 alone having the node name "BBB" is selected on the copy destination designation screen 120, a copy main screen 110c of FIG. 2 is displayed. The copy main screen 110c includes information 111c showing that the multi-function device 94 is a target multi-function device. While the setting items D2, D3, and others can be set to the multi-function device 94, the setting items D1, D7, and D9 cannot be set to the multi-function device 94. Accordingly, on the copy main screen 110c, the setting items D2, D3, and others, which can be set to the multi-function device 94, are displayed in a different state (i.e., grayed out or not) from that of the setting items D1, D7, and D9, which cannot be set to the multi-function device 94. Meanwhile, the setting items D1, D7, and D9, which cannot be set to the multi-function device 94, are different from the setting items D1, D5, and D7, which cannot be set to the multi-function device 92. Accordingly, on the copy main screen 110b, the setting item D5 is displayed in the grayed-out state, and the setting item D9 is displayed in the normal state. However, on the copy main screen 110c, the setting item D5 is displayed in the normal state, and the setting item D9 is displayed in the grayed-out state. In other words, the copy main screen 110c is different from the copy main screen 110b.

(If the Multi-Function Devices 92 and 94 (AAA, BBB) are Selected)

Figure 3:
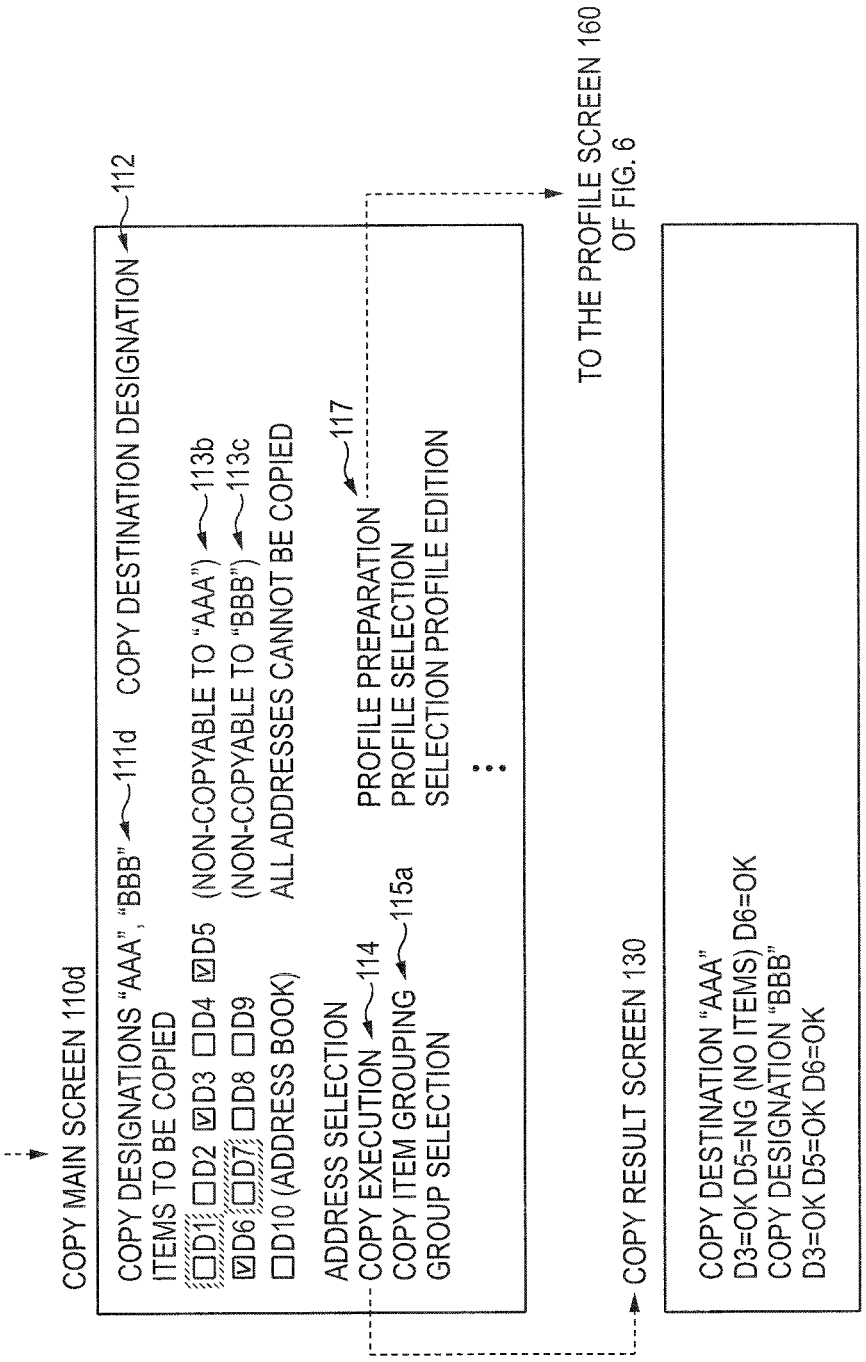
FIG. 3 shows one example of a copy main screen.

If the multi-function devices 92 and 94 having the node names "AAA" and "BBB," respectively, are selected on the copy destination designation screen 120, a copy main screen 110d of FIG. 3 is displayed. The copy main screen 110d includes information 111d showing that the multi-function devices 92 and 94 are target multi-function devices. On the copy main screen 110d, the setting items D2, D3, and others, which can be set for both the multi-function devices 92 and 94, are displayed in a different state from that of the setting items D1, D5, D7, and D9, which cannot be set to at least one of the multi-function devices 92 and 94. Specifically, the setting items D2, D3, and others, which can be set for both the multi-function devices 92 and 94, the setting items D5 and D9, which cannot be set for at least one of the multi-function devices 92 and 94, and the setting items D1 and D7, which can be set to none of the multi-function devices 92 and 94, are displayed in different states. More specifically, the setting items D2, D3, and others are displayed in the normal state (i.e., the state that can be selected by the user). The setting items D1 and D7 are displayed in the grayed-out state (i.e., the state that cannot be selected by the user). The setting items D5 and D9 are displayed in the normal state, and information 113b and 113c showing that the setting items D5 and D9 can be set to only one of the multi-function devices 92 and 94 (cannot be copied to "AAA" (or "BBB")) is displayed in association with the setting items D5 and D9. According to this configuration, the user can easily see that the setting items D5 and D9 can be set to only one of the target multi-function devices 92 and 94. Meanwhile, as clearly seen from FIGS. 2 and 3, the copy main screens 110b to 110d are different. In this embodiment, an appropriate one of the copy main screens 110b to 110d can be displayed, depending on the target multi-function devices (i.e., setting items, which can be set to target multi-function devices).

On the copy main screen 110d, the setting items D3, D5, and D6 are selected by the user (in other words, the setting items D3, D5, and D6 are target setting items). In this state, by operating the operation portion 84 of the PC 80, the user can select a selection item 114 showing "copy execution." In this case, among a plurality of setting values corresponding to the plurality of the setting items D1 to D10 stored in the setting value storage region 40, setting values corresponding to the target setting items D3, D5, and D6, respectively, are transmitted to each of the target multi-function devices 92 and 94. As a result, the setting values corresponding to the target setting items D3, D5, and D6 are set (i.e., copied) to each of the target multi-function devices 92 and 94.

(Copy Result Screen 130 (FIG. 3))

If the setting values have been set to each of the multi-function devices 92 and 94, a copy result screen 130 of FIG. 3 is displayed. As described above, the setting item D5 cannot be set to the multi-function device 92. Accordingly, the copy result screen 130 of FIG. 3 includes information (D5=NG (No items)) showing that a setting value corresponding to the setting item D5 is not set to the multi-function device 92. By seeing the copy result screen 130, the user can easily understand which setting item is set to which multi-function device.

As in the copy main screen 110d of FIG. 3, if target setting items are selected, and then a selection item (reference numeral omitted) showing "copy execution" is selected, on the copy main screens 110b and 110c of FIG. 2, setting values corresponding to the target setting items are transmitted to a target multi-function device (e.g., the multi-function device 92 in the case of the copy main screen 110b). In this case, the same copy result screen as the copy result screen 130 of FIG. 3 is displayed.

On the copy main screen 110d of FIG. 3, if a selection item 112 showing "copy destination designation" is selected, the copy destination designation screen 120 of FIG. 2 is displayed again. Accordingly, the user can change the target multi-function devices. For example, if the target multi-function devices are changed only into the multi-function device 92, the copy main screen 110b of FIG. 2 is displayed.

(Grouping)

On the copy main screen 110d of FIG. 3, if the target setting items D3, D5, and D6 are selected, and then a selection item 115a showing "copy item grouping" is selected, group information (refer to S72 of FIG. 10) showing the target setting items D3, D5, and D6 is stored in the setting relation information storage region 42 (refer to FIG. 1) of the memory 34. In this case, the user can select a desired group name (hereinafter, referred to as a "certain group name"). Accordingly, the group information and the certain group name are stored in the setting relation information storage region 42 in correspondence with each other.

Figure 4:
FIG. 4 shows one example of a copy main screen.

For example, the user may access the web server function of the multi-function device 10 again to select the selection item 102 showing "setting value copy" on the top screen 100 of FIG. 2. Next, the user can select the selection item 115b showing "group selection" on the copy main screen 110a of FIG. 2. In this case, the user can select the certain group name. In this case, a copy main screen 110e of FIG. 4 is displayed. On the copy main screen 110e, the target setting items D3, D5, and D6 shown in the group information corresponding to the certain group name stored in the setting relation information storage region 42 are displayed in the state that has already been selected (check boxes in the checked state). Accordingly, the user can see the target setting items D3, D5, and D6 that the user previously selected.

(Address Selection Screen 140 (FIG. 5))

As shown in the information 113a of the copy main screen 110b of FIG. 2, all address information included in the address book of the multi-function device 10 cannot be set (i.e., copied) to the multi-function device 92. Under the circumstances, the user can select a selection item 116 showing "address selection" on the copy main screen 110b of FIG. 2. In this case, an address selection screen 140 of FIG. 5 is displayed. The address selection screen 140 includes already selected address number information (40 information) showing the number of address information (hereinafter, referred to as "target address information) selected by the user, from a plurality of address information included in the address book of the multi-function device 10. The address selection screen 140 additionally includes maximum address number information (20 information) and copyable address number information (15 information) of the multi-function device 92 having the node name "AAA." The maximum address number information shows the maximum number of address information that can be stored in the address book of the multi-function device 92. The copyable address number information represents a value obtained by subtracting the number of protection address information (5 information) from the maximum address number information (20 information). Meanwhile, the protection address information is address information, which is selected by the user in advance to not be removed from the address book of the multi-function device 92.

The address selection screen 140 additionally includes a plurality of pieces of address information 142 included in the address book of the multi-function device 10, and a plurality of check boxes. Each of the address information 142 includes a name (e.g., a personal name and a corporate name) and an address (e.g., a phone number, a fax number, an electronic mail address). The address information 142 corresponding to a check box in a checked state is already selected address information. The user can change the state of the check box from the checked state into the non-checked state, or in reverse. Accordingly, the user can select address information (i.e., target address information), which is to be set to the multi-function device 92, from the plurality of the address information included in the address book of the multi-function device 10. As described above, since copyable address number information of the multi-function device 92 is 15, the user selects 15 or less target address information.

(Protection Address Screen 150 (FIG. 5))

If a selection item 144 showing "designation and release of a protection address" is selected on the address selection screen 140, a protection address screen 150 of FIG. 5 is displayed. The protection address screen 150 includes maximum address number information (20 information) and copyable address number information (15 information) of the multi-function device 92. The protection address screen 150 additionally includes a plurality of address information 152 included in the address book of the multi-function device 92 and a plurality of check boxes. The address information 152 corresponding to a check box in a checked state is protection address information. The user can change the state of the check boxes from the checked state into the non-checked state, or in reverse. Accordingly, the user can select and/or release protection address information included in the address book of the multi-function device 92. For example, if release of protection address information is performed, copyable address number information of the multi-function device 92 increases. As a result, the user can increase the number of target address information, which is to be set to the multi-function device 92. Meanwhile, after designation and/or release of protection address information is performed, the user can select target address information on the address selection screen 140. If target address information is selected on the address selection screen 140, and then a selection item (reference numeral omitted) showing "copy execution" is selected, target address information among the plurality of pieces of address information included in the address book of the multi-function device 10 is transmitted (i.e., set) to the multi-function device 92.

(Profile Screen 160 (FIG. 6))

On the copy main screen 110*d* of FIG. 3, if the target setting items D3, D5, and D6 are selected and then a selection item 117 showing "profile preparation" is selected, a profile screen 160 of FIG. 6 is displayed. The profile screen 160 includes information showing the target multi-function devices 92 and 94, information showing the target setting items D3, D5, and D6, a first selection item 162, and a second selection item 164. Meanwhile, the user can select a profile name on the profile screen 160. If the first selection item 162 is selected, the user can additionally select time or frequency (e.g., per day or per week). If a finish button, not illustrated, is selected, profile information (refer to S126 of FIG. 12) including the information showing the target multi-function devices 92 and 94, the information showing the target setting items D3, D5, and D6, and selection information showing which of the first and second selection items 162 and 164 has been selected is stored in the setting relation information storage region 42 of the memory 34. Meanwhile, the profile information is stored in the setting relation storage region 42 in correspondence with a profile name selected by the user. If the first selection item 162 is selected, the selection information additionally includes time or frequency selected by the user. How the profile information is utilized will be described later.

By selecting a selection item (reference numerals omitted) showing "profile selection" and "selection profile edition" on the copy main screen 110*d* of FIG. 3, the user can change contents of the profile information stored in the setting relation information storage region 42.

(Setting Screen 170 (FIG. 7))

Figure 7:
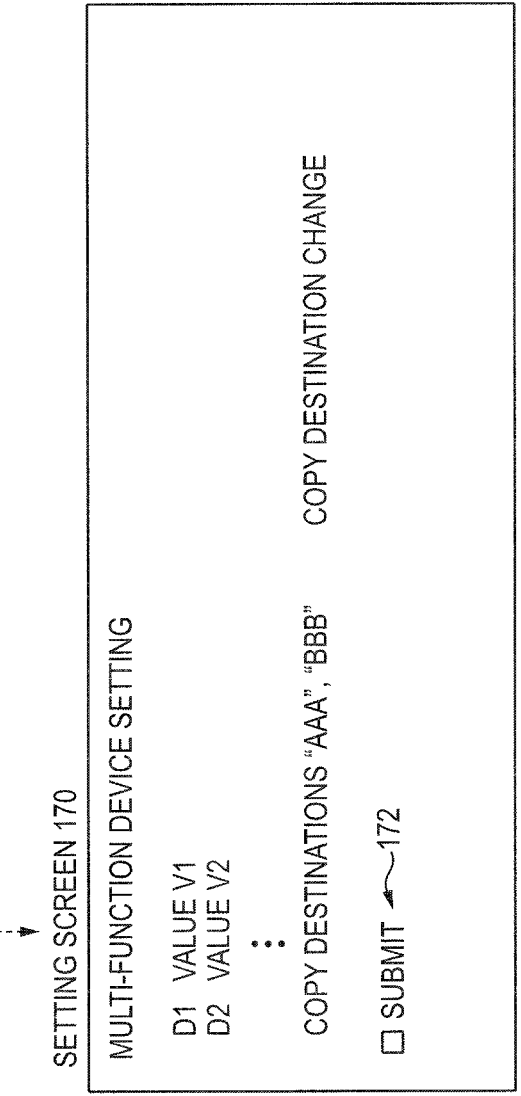
FIG. 7 shows one example of a setting screen.

If a selection item 104 showing "multi-function device setting" is selected on the top screen 100 of FIG. 2, a setting screen 170 of FIG. 7 is displayed. The setting screen 170 includes a plurality of setting values V1, V2, and others stored in the setting value storage region 40. The user can change a setting value (e.g., V1) of one (e.g., D1) of the setting items on the setting screen 170. Accordingly, for example, the user can change the print paper size of a default from "A4" to "B5." As a result, the setting value (e.g., "A4") prior to the change is removed from the setting value storage region 40. The setting value (e.g., "B5") after the change is stored in the setting value storage region 40. Meanwhile, if the user selects a selection item 172 showing "submit" on the setting screen 170, the setting value after the change is transmitted (i.e., set) to the target multi-function device that was previously selected on the copy destination designation screen 120 of FIG. 2.

(Details of the Web Server Processes Executed by the Multi-Function Device 10)

Subsequently, the web server processes executed by the multi-function device 10 will be described in detail with reference to FIGS. 8 to 12. Meanwhile, processes (S12, S22, and others of FIG. 8) for generating screen data showing the screens 100 and 110*a*, respectively, will be described below. In the processes, each of screen data is generated by using a template for generation of a screen, which is stored in advance in the memory 34. Explanation of the template for generation of a screen will be omitted.

(Processes for Display of the Top Screen 100 of FIG. 2)

Figure 8:
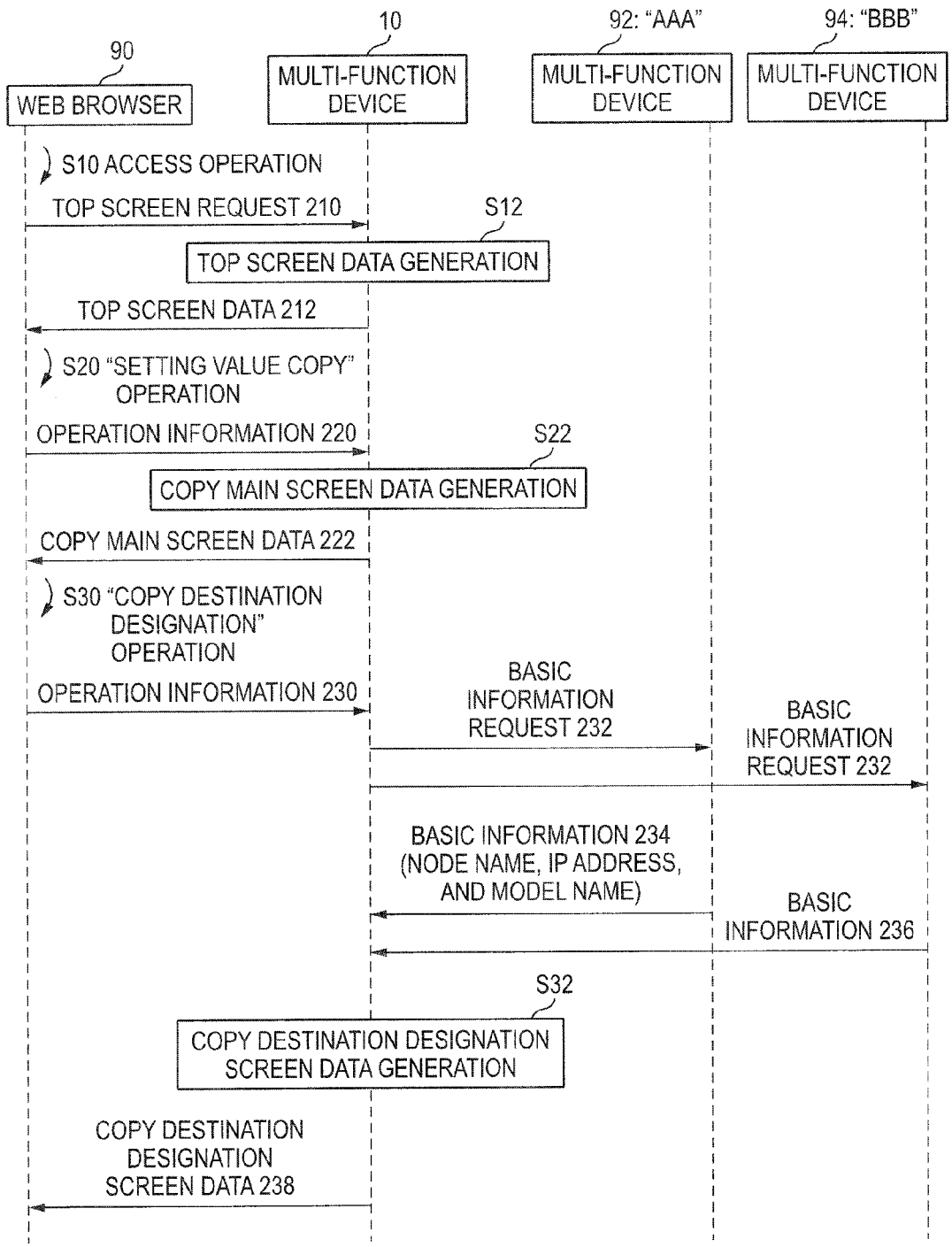
FIG. 8 is a sequence view for processes for copy of settings.

As shown in FIG. 8, the user of the PC 80 executes access operation to enter URL of the web server of the multi-function device 10 into the PC 80 (S10). In this case, the web browser 90 of the PC 80 transmits a top screen request 210 to the multi-function device 10. Upon receiving the top screen request 210, a screen data supply portion 62 (refer to FIG. 1) of the multi-function device 10 generates top screen data 212 in the HTML (Hyper Text Markup Language) form for showing the top screen 100 of FIG. 2 (S12). Further, the screen data supply portion 62 transmits the top screen data 212 to the web browser 90. As a result, the top screen 100 of FIG. 2 is displayed on a display portion 82 of the PC 80.

(Processes for Display of the Copy Main Screen 110*a* of FIG. 2)

If the selection item 102 showing "setting value copy" is selected on the top screen 100 of FIG. 2 (S20 of FIG. 8), the web browser 90 of the PC 80 transmits operation information 220 to the multi-function device 10. Upon receiving the operation information 220, the screen data supply portion 62 of the multi-function device 10 generates copy main screen data 222 in the HTML form for showing the copy main screen 110*a* of FIG. 2 (S22). Further, the screen data supply portion 62 transmits the copy main screen data 222 to the web browser 90. As a result, the copy main screen 110*a* of FIG. 2 is displayed on the display portion 82 of the PC 80.

(Processes for Display of the Copy Destination Designation Screen 120 of FIG. 2)

As shown in FIG. 8, if the selection item 112 showing "copy destination designation" is selected on the copy main screen 110*a* of FIG. 2 (S30), the web browser 90 of the PC 80 transmits operation information 230 to the multi-function device 10. Upon receiving the operation information 230, an acquisition portion 64 of the multi-function device 10 transmits a basic information request 232 to each of the multi-function devices 92, 94, and 96 (the multi-function device 96 is omitted in FIG. 8). In accordance with the basic information request 232, each of the multi-function devices 92, 94, and 96 transmits its basic information 234 and 236 (an IP address, a node name, and a model name) to the multi-function device 10. As a result, the acquisition portion 64 acquires the basic information 234 and 236. Next, the screen data supply portion 62 of the multi-function device 10 generates copy destination designation screen data 238 in the HTML form for showing the copy destination designation screen 120 of FIG. 2, by using the basic information 234 and 236 (S32). Specifically, the screen data supply portion 62 generates copy destination designation screen data 238 including information shown (an IP address, and others) in the basic information 234 and 236. Next, the screen data supply portion 62 transmits the copy destination designation screen data 238 to the web browser 90. As a result, the copy destination designation screen 120 of FIG. 2 is displayed on the display portion 82 of the PC 80.

(Processes for Display of the Copy Main Screens 110*b* to 110*d* of FIGS. 2 and 3)

Figure 9:
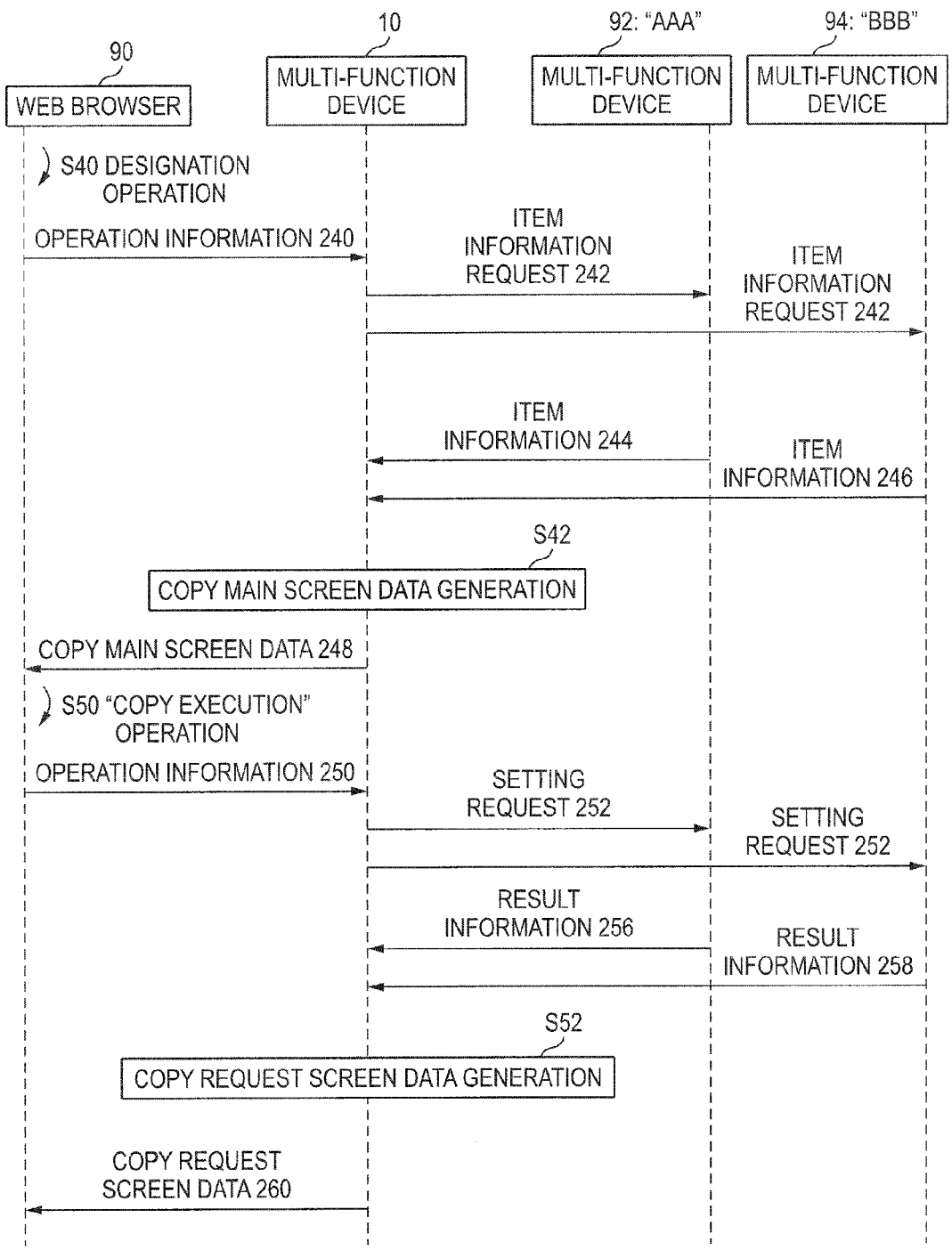
FIG. 9 is a sequence view for subsequent processes of FIG. 8.

As shown in FIG. 9, if target multi-function devices are selected on the copy destination designation screen 120 of FIG. 2 (S40), the web browser 90 of the PC 80 transmits operation information 240 including information showing the target multi-function devices to the multi-function device 10. Upon receiving the operation information 40, the acquisition portion 64 of the multi-function device 10 transmits an item information request 242 only to the target multi-function devices shown in the operation information 240. In the example of FIG. 9, the multi-function devices 92 and 94 are target multi-function devices. Thus, the item information request 242 is transmitted to the multi-function devices 92 and 94. However, if the multi-function device 92 alone is a target multi-function device, the item information request 242 is transmitted only to the multi-function device 92. In accordance with the item information request 242, each of the target multi-function devices 92 and 94 transmits item information 244 and 246 to the multi-function device 10. Accordingly, the acquisition portion 64 acquires the item information 244 and 246. Each of the item information 244 and 246 includes information (e.g., D2 to D4, D6, and D8 to D10 in case of the multi-function device 92) showing setting items, which can be set to the multi-function devices that are transmission sources of the item information, and maximum address number information of the address books of the multi-function devices that are transmission sources of the item information.

Subsequently, the screen data supply portion 62 of the multi-function device 10 generates copy main screen data 248 in the HTML form for showing a new copy main screen, by using the item information 246 and 248 (S42). And, the screen data supply portion 62 transmits the copy main screen data 248 to the web browser 90. As a result, the copy main screens 110b and 110c of FIG. 2, the copy main screen 110d of FIG. 3, and others are displayed on the display portion of the PC 80.

For example, if the multi-function device 92 alone is a target multi-function device, in S42, the screen data supply portion 62 specifies setting items D1, D5, and D7, which cannot be set to the multi-function device 92, and setting items D2 to D4, D6, and D8 to D10, which can be set to the multi-function device 92, by reference to the item information 244 acquired from the multi-function device 92. Subsequently, the screen data supply portion 62 generates copy main screen data 248, in which the former setting items D1, D5, and D7 are in the grayed-out state, and the latter setting items D2 to D4, D6, and D8 to D10 are in the normal state. If the number of address information included in the address book of the multi-function device 10 is larger than the maximum address number information included in the item information 244 acquired from the multi-function device 92, the screen data supply portion 62 generates copy main screen data 248 including character strings showing the information 113a of the copy main screen 110b of FIG. 2. As a result, copy main screen data 248 showing the copy main screen 110b of FIG. 2 are generated. Meanwhile, if the multi-function device 94 alone is a target multi-function device, in S42, the screen data supply portion 62 generates copy main screen data 248 showing the copy main screen 110c of FIG. 2, by using the item information 246 acquired from the multi-function device 94, as in the multi-function device 92.

For example, if the multi-function devices 92 and 94 are target multi-function devices, in S42, the screen data supply portion 62 specifies setting items D2 to D4, D6, D8, and D10, which can be set to both the multi-function devices 92 and 94, and a setting item D9, which can be set only to the multi-function device 92, a setting item D5, which can be set only to the multi-function device 94, and setting items D1 and D7, which can be set to none of the multi-function devices 92 and 94, by reference to the item information 246 and 248. Next, the screen data supply portion 62 generates copy main screen data 248, in which the setting items D1 and D7 are in the grayed-out state, and the other setting items are in the normal state. Additionally, the screen data supply portion 62 generates copy main screen data 248 including character strings showing the information 113b and 113c of the copy main screen 110d of FIG. 3. As a result, copy main screen data 248 showing the copy main screen 110d of FIG. 3 are generated.

(Processes for Copy of Setting Values)

As shown in FIG. 9, if the selection item 114 showing "copy execution" is selected on the copy main screens 110b to 110d of FIGS. 2 and 3 (S50), the web browser 90 of the PC 80 transmits information showing target multi-function devices, and operation information 250 including information showing target setting items to the multi-function device 10. Upon receiving the operation information 250, a transmission portion 66 (refer to FIG. 1) of the multi-function device 10 acquires setting values corresponding to the target setting items shown in the operation information 250 from the setting value storage region 40. Next, the transmission portion 66 transmits a setting request 252 including the setting values corresponding to the target setting items only to the target multi-function devices (the multi-function devices 92 and 94 in the example of FIG. 9). Meanwhile, if the setting item D10 corresponding to the address book is a target setting item, the operation information 250 additionally includes target address information (address information selected on the address selection screen 140 of FIG. 5). In this case, the transmission portion 66 transmits a setting request 252 additionally including the target address information (a kind of setting values). Upon receiving the setting request 252, each of the target multi-function devices 92 and 94 sets (stores in the memory) each of the setting values included in the setting request 252 as its setting value. Accordingly, the setting values of the multi-function devices 10 are copied to each of the target multi-function devices 92 and 94.

(Processes for Display of the Copy Result Screen 130 of FIG. 3)

Each of the target multi-function devices 92 and 94 transmits result information 256 and 258 to the multi-function device 10. Each of the result information 256 and 258 includes information showing whether the setting values included in the setting request 252 have been copied to each of the target multi-function devices 92 and 94 (for example, D3=OK, D5=NG, D6=OK (refer to the copy result screen 130 of FIG. 3)). The screen data supply portion 62 of the multi-function device 10 generates copy result screen data 260 in the HTML form for showing the copy result screen 130 of FIG. 3, by using the result information 256 and 258 (S52). And, the screen data supply portion 62 transmits the copy result screen data 260 to the web browser 90. As a result, the copy result screen 130 of FIG. 3 is displayed on the display portion 82 of the PC 80.

(Processes for Registration of Group Information)

Figure 10:
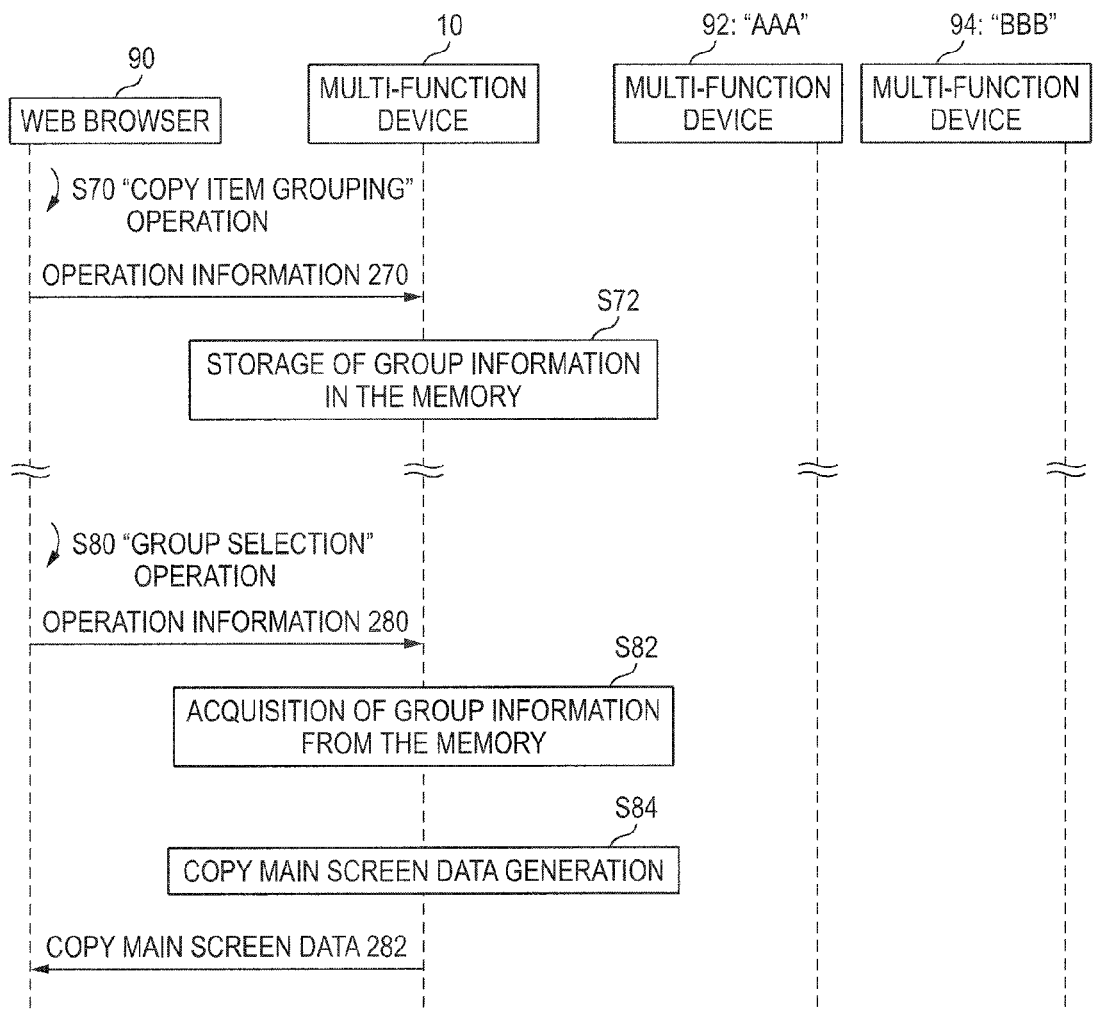
FIG. 10 is a sequence view for processes for grouping.

As shown in FIG. 10, if the selection item 115a showing "copy item grouping" is selected on the copy main screen 110d of FIG. 3 (S70), the web browser 90 of the PC 80 transmits operation information 270 including information showing a group name and target setting items to the multi-function device 10. Upon receiving the operation information 270, a first storage control portion 68 (refer to FIG. 1) of the multi-function device 10 stores the group name included in the operation information 270 and group information showing the target setting items included in the operation information 270 in correspondence with each other in the setting relation information storage region 42 (S72).

If the selection item 115b showing "group selection" is selected on the copy main screen 110a of FIG. 2, and a group name is selected by the user (S80 of FIG. 10), the web browser 90 of the PC 80 transmits operation information 280 including the group name selected by the user to the multi-function device 10. Upon receiving the operation information 280, the screen data supply portion 62 of the multi-function device 10 acquires group information corresponding to the group name included in the operation information 280, from the setting relation information storage region 42 (S82). Next, the screen data supply portion 62 generates copy main screen data 282, by using the group information acquired in S82 (S84). Specifically, the screen data supply portion 62 generates copy main screen data 282, in which check boxes corresponding to the target setting items shown in the group information acquired in S82 are in the checked state. The screen data supply portion 62 transmits the copy main screen data 282 to the web browser 90. As a result, the copy main screen 110*e* of FIG. 4 is displayed on the display portion 82 of the PC 80.

(Processes for Display of the Address Selection Screen 140 of FIG. 5)

Figure 11:
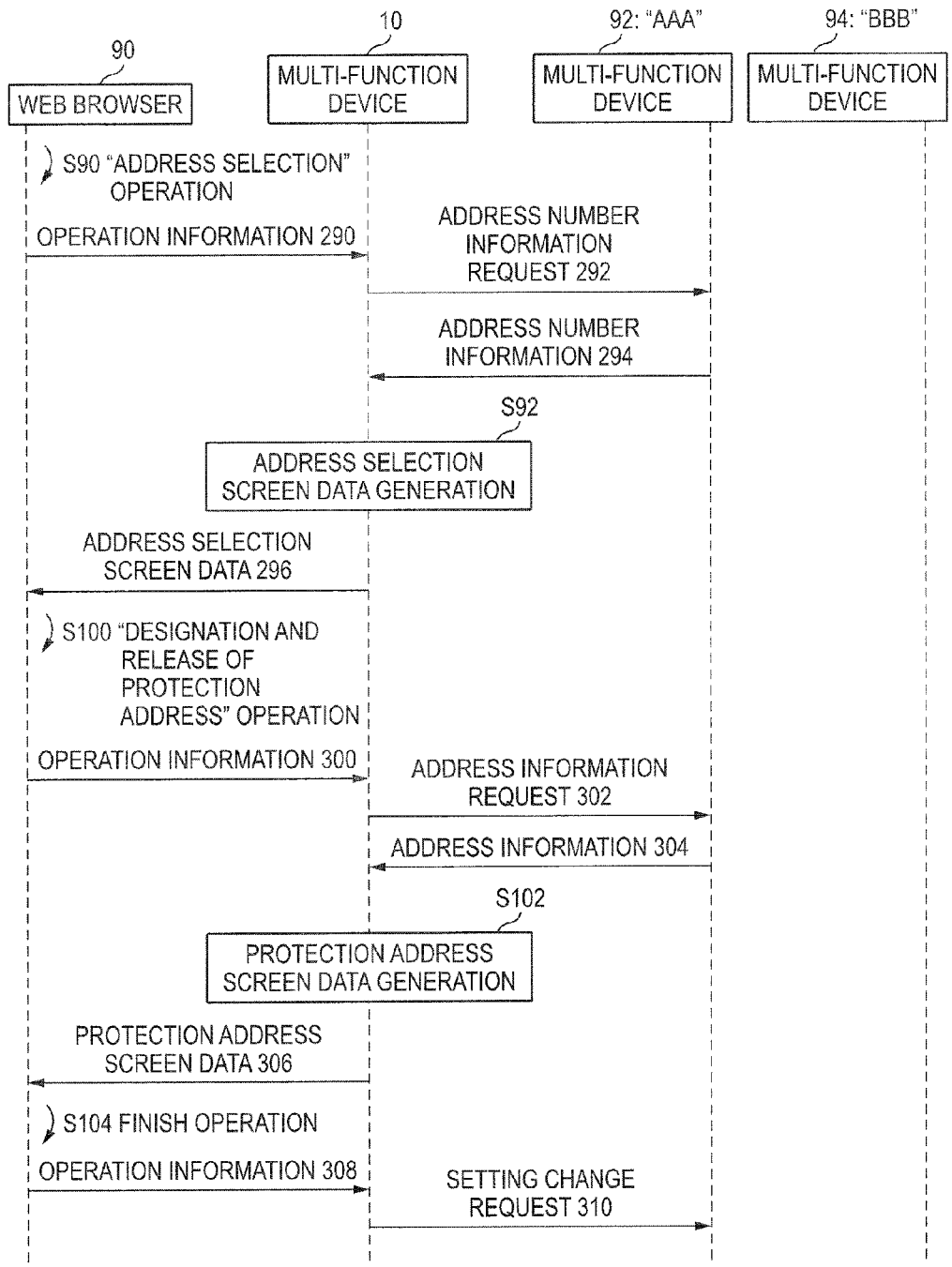
FIG. 11 is a sequence view for processes for address selection.

As shown in FIG. 11, if the selection item 116 showing "address selection" is selected on the copy main screen 110*b* of FIG. 2 (S90), the web browser 90 of the PC 80 transmits operation information 290 including information showing the target multi-function device 92 to the multi-function device 10. Upon receiving the operation information 290, the acquisition portion 64 of the multi-function device 10 transmits an address number information request 292 to the target multi-function device 92 shown in the operation information 290. In accordance with the address number information request 292, the multi-function device 92 transmits copyable address number information 294 ("15 information" in the example of FIG. 5) of the multi-function device 92 to the multi-function device 10. The screen data supply portion 62 of the multi-function device 10 generates address selection screen data 296, by using the copyable address number information 294. Specifically, the screen data supply portion 62 generates the address selection screen data 296 including the copyable address number information 294 ("15 information" in the example of FIG. 5). Meanwhile, since the item information 244 of FIG. 9 includes maximum address number information, the screen data supply portion 62 generates address selection screen data 296 including the maximum address number information ("20 information" in the example of FIG. 5) shown in the item information 244. Additionally, the screen data supply portion 62 generates address selection screen data 296 including a plurality of address information included in the address book of the multi-function device 10 and a plurality of check boxes. The screen data supply portion 62 transmits the address selection screen data 296 to the web browser 90. As a result, the address selection screen 140 of FIG. 5 is displayed on the display portion 82 of the PC 80.

(Processes for Display of the Protection Address Screen 150 of FIG. 5)

If the selection item 144 showing "designation and release of protection address" is selected on the address selection screen 140 of FIG. 5 (S100), the web browser 90 of the PC 80 transmits operation information 300 to the multi-function device 10. Upon receiving the operation information 300, the acquisition portion 64 of the multi-function device 10 transmits an address information request 302 to the target multi-function device 92. As a result, the multi-function device 92 transmits address information 304 included in the address book of the multi-function device 92 to the multi-function device 10. The address information 304 includes information showing whether the address information is protection address information. The screen data supply portion 62 of the multi-function device 10 generates protection address screen data 306, by using the address information (S102). Specifically, the screen data supply portion 62 generates protection address screen data 306 including the address information 304. Additionally, the screen data supply portion 62 generates protection address screen data 306, in which check boxes corresponding to the address information, which is protection address information, are in the checked state. The screen data supply portion 62 transmits the protection address screen data 306 to the web browser 90. As a result, the protection address screen 150 of FIG. 5 is displayed on the display portion 82 of the PC 80.

If a finish button, not illustrated, is selected on the protection address screen 150 of FIG. 5 (S104), the web browser 90 of the PC 80 transmits operation information 308 including address information in the checked state to the multi-function device 10. Upon receiving the operation information 300, the control portion 30 (refer to FIG. 1) of the multi-function device 10 transmits a setting change request 310 to the target multi-function device 92. The setting change request 310 includes address information (i.e., the address information in the checked state) included in the operation information 308. In accordance with the setting change request 310, the multi-function device 92 changes contents of the address book of the multi-function device 92. That is, in the address book of the multi-function device 92, the multi-function device 92 sets the address information included in the setting change request 310 as protection address information. If address information in the address book of the multi-function device 92, which is not included in the setting change request 310, is set as protection address information, the multi-function device 92 sets the above protection address information as normal address information (i.e., releases protection).

(Processes for Display of the Profile Screen 160 of FIG. 6)

As shown in FIG. 12, if the selection item 117 showing "profile preparation" is selected on the copy main screen 110*d* of FIG. 3 (S120), the web browser 90 of the PC 80 transmits operation information 320 including information showing target multi-function devices and information showing target setting items to the multi-function device 10. Upon receiving the operation information 320, the screen data supply portion 62 of the multi-function device 10 generates profile screen data 322 showing a profile screen 610 of FIG. 6, by using the operation information 320 (S122). And, the screen data supply portion 62 transmits the profile screen data 322 to the web browser 90. As a result, the profile screen 160 of FIG. 6 is displayed on the display portion 82 of the PC 80.

If a finish button, not illustrated, is selected on the profile screen 160 of FIG. 6 (S124), the web browser 90 of the PC 80 transmits operation information 324 including the information showing the target multi-function devices 92 and 94, the information showing the target setting items D3, D5, and D6, profile names, and selection information showing which of the first and second selection items 162 and 164 has been selected to the multi-function device 10. If the first selection item 162 has been selected, the selection information includes time or frequency. Upon receiving the operation information 324, a second storage control portion 70 (refer to FIG. 1) of the multi-function device 10 stores the profile names included in the operation information 324 in correspondence with profile information in the setting relation information storage region 42 (S126). The profile information includes information, other than profile names, included in the operation information 324.

(Monitoring Processes)

If first profile information including selection information showing that the first selection item 164 of FIG. 6 has been selected is stored in the setting relation information storage region 42, the transmission portion 66 monitors that a setting value corresponding to any one of the target setting items D3, D5, and D6 included in the first profile information is changed (S128). If a setting value corresponding to any one of the target setting items D3, D5, and D6 is changed, the transmission portion 66 transmits setting requests 326 and 328 including new setting values corresponding to the changed setting item (e.g., D3) to each of the target multi-function devices 92 and 94 included in the first profile information. As a result, setting values of each of the multi-function devices 92 and 94 are changed into the new setting values. According to this configuration, the user can set setting values corresponding to target setting items to each of the target multi-function devices 92 and 94, at a timing designated by the user (i.e., timing of changing setting values).

If second profile information including selection information showing that the second selection item 164 of FIG. 6 has been selected is stored in the setting relation information region 42, the transmission portion 66 monitors arrival at a timing (time or frequency) shown in the selection information (S128). If arrival at the timing is accomplished, the transmission portion 66 transmits setting requests 326 and 328 including setting values corresponding to the target setting items D3, D5, and D6, respectively, included in the second profile information to each of the target multi-function devices 92 and 94 included in the second profile information. As a result, the setting values of each of the target multi-function devices 92 and 94 can be changed. According to this configuration, the user can set setting values corresponding to target setting items to each of the target multi-function devices 92 and 94, at a timing (i.e., time or frequency) designated by the user.

Effect of an Embodiment

According to an embodiment of the present invention, in order to enable the multi-function device 10 to supply the copy destination designation screen data 238 (refer to FIG. 8) and the copy main screen data 248 (refer to FIG. 9) to the web browser 90, the user can select a target multi-function device on the copy destination designation screen 120 (refer to FIG. 2), and select target setting items on the copy main screens 110b to 110d. The multi-function device 10 transmits setting values corresponding to the target setting items to the target multi-function device. As a result, the setting values corresponding to the target setting items are set (i.e., copied) to the target multi-function device. Additionally, for example, if the multi-function device 92 alone is selected, the multi-function device 10 generates copy main screen data 248 (refer to FIG. 9) for showing the copy main screen 110b, on which setting items, which can be copied to the multi-function device 92, are distinguished from setting items, which cannot be set to the multi-function device 92, by using the item information 244 (refer to FIG. 9) acquired from the multi-function device 92. Accordingly, the user can easily see the setting items, which can be set to the multi-function device 92. As a result, the user can easily select setting items, which are to be set (i.e., copied) to the multi-function device 92. According to this configuration, the user can easily set setting values of the multi-function device 10 to the target multi-function device 92. Meanwhile, even if the multi-function device 94 is a target multi-function device, and the multi-function devices 92 and 94 are target multi-function devices, the same effect can be obtained.

(Correspondence Relationship)

How the elements of this embodiment of the present invention may correspond to the elements of the present invention will be described. The multi-function device 10, the multi-function devices 92 to 96, and the PC 80 are examples of the "function execution device," the "at least one of other devices," and the "display device," respectively. Especially, the multi-function devices 92 and 94 are examples of the "first target device" and the "second target device," respectively. The copy destination designation screen 120 and the copy main screens 110a to 110e are examples of the "device screen" and the "item screens," respectively. Especially, the copy main screens 110b, 110c, and 110d are examples of the "first, second, and third item screens," respectively. The copy main screen data 282 (refer to FIG. 10) showing the copy main screen 110e are an example of the "new item screen data." The item information 244 (refer to FIG. 9) and the address number information 294 (refer to FIG. 11) are examples of the "first device information." The item information 246 (refer to FIG. 9) is an example of the "second device information."

On the copy main screen 110b, the setting items D2, D3, and others, the setting items D1, D5, and D7 are examples of the "first type of setting items," and the "second type of setting items," respectively. On the copy main screen 110c, the setting items D2, D3, and others, and the setting items D1, D7, and D9 are examples of the "third type of setting items" and the "fourth type of setting items," respectively. On the copy main screen 110d, the setting items D2, D3, and others, and the setting items D1, D5, D7, and D9 are examples of the "fifth type of setting items," and the "sixth type of setting items," respectively. The information 113b and 113c of the copy main screen 110d are an example of the "certain information."

The setting item D10 corresponding to the address book, and the address selection screen 140 are examples of the "first setting item," and the "selection screen," respectively. The number of address information included in the address book of the multi-function device 10, and copyable address number information (15 information) of the multi-function device 92 are examples of "M" and "N," respectively. The target setting items D3, D5, and D6 (refer to FIG. 3), which are targets for grouping, the operation information 270 (refer to FIG. 10), the operation information 280, the group information, and check boxes in the checked state are examples of the "second setting items," the "first command," the "second command," the "already selected information," and the "state that has already been selected," respectively. The target multi-function devices 92 and 94, the target setting items D3, D5, and D6, the operation information 324 (refer to FIG. 12) are examples of the "third target devices," the "third setting items," and the "third command," respectively.

Modified Embodiment 1

In this embodiment, the screen data supply portion 62 supplies screen data to the web browser of the PC 80. Instead, the screen data may be supplied to the display portion 12 of the multi-function device 10. In this modified embodiment, the display portion 12 of the multi-function device 10 is an example of the "display device."

Modified Embodiment 2

In this embodiment, CPU 32 executes processes in accordance with the programs 36 and 38, so that each of the portions 60 to 70 is realized. However, at least one of the portions 60 to 70 may be realized by hardware such as a logic circuit.

Modified Embodiment 3

On the copy main screens 110b to 110d of FIGS. 2 and 3, the color of setting items, which can be set to a target multi-function device, and the color (grayed-out) of setting items, which cannot be set to a target multi-function device, may not be changed. For example, information such as "settable items," and "non-settable items" may be displayed. This modified embodiment also is included in the configuration of "a first (second and third) item screen, on which a first type (third type and fifth type) of setting items are distinguished from a second (fourth and sixth) type of setting items." Meanwhile, the above configuration includes the configuration, in which a first (second and third) item screen includes only the first (third and fifth) type of setting items, and does not include the second (fourth and sixth) type of setting items.

Modified Embodiment 4

In this embodiment, the item information 244 (refer to FIG. 9) showing setting items, which can be set to a target multi-function device, is one example of the "device information." Instead, the "device information" may be impossibility information showing setting items, which cannot be set to target multi-function devices. The acquisition portion 64 may transmit information showing the setting item D1 to a target multi-function device, and acquire possibility information showing whether the setting item D1 can be set to the target multi-function device or not from the target multi-function device. Likewise, the acquisition portion 64 may transmit information showing the setting items D2, D3, and others to a target multi-function device in sequence, and acquire impossibility information of each of the setting items from the target multi-function device. In this case, the possibility information corresponding to each of the setting items is an example of the "device information." In other words, the "device information" can be named "information related to setting items, which can be set to a target multi-function device (this information includes impossibility information and possibility information of this modified embodiment, as well as the item information 244 and 246 of this embodiment).

Modified Embodiment 5

In this embodiment, the copy destination designation screen 120 and the copy main screen 110b are separate screens. Instead, the screen data supply portion 62 may generate one screen data for showing one screen including the copy destination designation screen 120 and the copy main screen 110b. In this modified embodiment, among the one screen data, the portion of the screen data showing the copy destination designation screen 120 is an example of the "device screen data." Among the one screen data, the portion of the screen data showing the copy main screen data 110b is an example of the "first item screen data."

Modified Embodiment 6

In this embodiment, the screen data supply portion 62 generates screen data in the HTML form. Instead, screen data in other forms (e.g., XHTML form), which are readable by the web browser 90, may be generated.

The embodiments of the present invention have been described. However, these embodiments are merely exemplary, and the scope of the claims is not limited to these embodiments. The technology described in the claims includes various modifications and alterations to the exemplary embodiments that have been described.

The technical elements described in this specification and/or the drawings accomplish their technical utility individually or in various combinations thereof, and are not limited to the combination defined in the claims at the time of the filing of this application. The technology described in this specification and/or the drawings achieves a plurality of objects at the same time, and has technical utility even if it achieves one of the plurality of objects.

What is claimed is:

1. A function execution device in communication with a plurality of devices, the function execution device comprising:
    a memory storing a plurality of setting values corresponding to a plurality of setting items;
    an execution portion capable of executing a function by using the plurality of setting values stored in the memory;
    a screen data supply portion supplying, to a display device,
        device screen data for showing a device screen, on which a user selects a target device from the plurality of devices, and
        item screen data for showing an item screen, on which the user selects at least one setting item from the plurality of setting items;
    an acquisition portion that acquires device information about the target device that is selected by the user on the device screen; and
    a transmission portion transmitting, to the target device, at least one setting value corresponding to the at least one setting item selected by the user on the item screen, among the plurality of setting values stored in the memory,
    wherein in a first case where only a first target device is selected on the device screen, the screen data supply portion generates first item screen data for showing a first item screen, on which a first type of setting items, which can be set for the first target device, among the plurality of setting items distinguished from a second type of setting items, which cannot be set for the first target device, among the plurality of setting items,
    wherein in a third case where both of the first target device and a second target device different from the first target device are selected on the device screen, the screen data supply portion generates third item screen data for showing a third item screen, on which a fifth type of setting items, a sixth type of setting items, and a seventh type of setting items, wherein the fifth type of setting items can be set for both the first and second target devices, among the plurality of setting items, the sixth type of setting items can be set for one of the first and second target devices and cannot be set for another one of the first and second target devices, among the plurality of setting items, the seventh type of setting items cannot be set for both of the first and second target devices, among the plurality of setting items, and
    wherein the third item screen distinguishably displays the fifth type of setting items, the sixth type of setting items, and the seventh type of setting items.

2. The function execution device according to claim 1, wherein in the first case, the screen data supply portion generates the first item screen data to enable the second type of setting items to be displayed in a state that cannot be selected by the user.

3. The function execution device according to claim 1, wherein in the first case, if M or more (M is an integer equal to or greater than 2) setting values corresponding to the first setting items among the plurality of setting items stored in the memory, and the first device information shows that N or less (N is an integer equal to or greater than 1, and less than M) setting values corresponding to the first setting items can be set for the first target device, the screen data supply portion additionally supplies, to the display device, selection screen data for showing a selection screen, on which the user selects the N or less setting values from the M or more setting values, and in the first case, if the first setting items are selected by the user on the first setting screen, and the N or less setting values are selected by the user on the selection screen, the transmission portion transmits the N or less setting values to the first target device.

4. The function execution device claimed in claim 1, wherein in a second case where only a second target device, which is different from the first target device, is selected on the device screen, the screen data supply portion generates second item screen data showing a second item screen, on which a third type of setting items, which can be set for the second target device, among the plurality of setting items, are distinguished from a fourth type of setting items, which cannot be set for the second target device, among the plurality of setting items, by using second device information acquired from the second target device, wherein the second item screen is different from the first item screen.

5. The function execution device claimed in claim 1, wherein in the third case, the screen data supply portion generates the third item screen data to enable the sixth type of setting items to be displayed in a state that can be selected by the user, and certain information showing that the sixth type of setting items can be set for one of the target devices to be displayed in association with the sixth type of setting items.

6. The function execution device claimed in claim 1, wherein the device further comprises a first storage control portion, in which if second setting items are selected by the user on the item screen, and a first command is received from the user, the first storage control portion stores selected information showing the second setting items in the memory, and wherein if a second command is received from the user, the screen data supply portion generates new item screen data to enable the second setting items shown in the selected information to be displayed as having been selected.

7. The function execution device claimed in claim 1, wherein the device further comprises a second storage control portion, in which if a third target device is selected by the user on the device screen, third setting items are selected by the user on the item screen, and a third command is received from the user, the second storage control portion stores profile information showing the third target device and the third setting items in the memory, and wherein the transmission portion transmits third setting values corresponding to the third setting items shown in the profile information, among the plurality of setting values stored in the memory, to the third target device shown in the profile information, at a timing selected by the user in advance.

8. The function execution device claimed in claim 1, wherein the screen data supply portion supplies, to the display device having a web browser, the device screen data in a form, which can be read by the web browser, and the item screen data in a form, which can be read by the web browser.

9. The function execution device according to claim 1, wherein the first type of setting item is displayed in a state that can be selectable by the user and the second type of setting item is displayed in a state that cannot be selectable by the user.

10. A non-transitory computer-readable storage medium having a computer program stored thereon and is readable by a computer provided in an information processing apparatus, said computer program, when executed by the computer, causes the computer to perform operations comprising:

storing a plurality of setting values corresponding to a plurality of setting items;

supplying, to a display device, device screen data for showing a device screen on which a user selects a target device from a plurality of devices, and item screen data for showing an item screen on which the user selects at least one setting item from the plurality of setting items;

acquiring device information about the target device that is selected by the user on the device screen;

transmitting, to the target device, at least one setting value corresponding to the at least one setting item selected by the user on the item screen, among the plurality of setting values stored in the memory; and in a first case where only a first target device is selected on the device screen, generating first item screen data for showing a first item screen on which a first type of setting items, which can be set for the first target device, among the plurality of setting items distinguished from a second type of setting items, which cannot be set for the first target device, among the plurality of setting items, wherein in a second case where both the first target device and a second target device different from the first target device are selected on the device screen, generating second item screen data showing a second item screen, on which a third type of setting items, a fourth type of setting items, and a fifth type of setting items, wherein the third type of setting items can be set for both of the first and second target devices, among the plurality of setting items, the fourth type of setting items can be set for one of the first and second target devices and cannot be set for another one of the first and second target devices, among the plurality of setting items, the fifth type of setting items cannot be set for both of the first and second target devices, among the plurality of setting items, wherein the second item screen distinguishably displays the third type of setting item, the fourth type of setting item, and the fifth type of setting items.

11. The non-transitory computer-readable medium according to claim 10, wherein the first type of setting item is displayed in a state that can be selectable by the user and the second type of setting item is displayed in a state that cannot be selectable by the user.

* * * * *